United States Patent [19]

Leiber et al.

[11] Patent Number: 5,035,295
[45] Date of Patent: Jul. 30, 1991

[54] STEERING CONTROL SYSTEM FOR A VEHICLE WITH A STEERED FRONT AXLE AND A STEERED REAR AXLE

[75] Inventors: Heinz Leiber, Oberriexingen; Werner Schneider, Winnenden; Erich Waxenberger, Neuhausen; Martin Klarer, Kernen; Richard Zimmer, Fellbach; Manfred Burckhardt, Waiblingen, all of Fed. Rep. of Germany

[73] Assignee: Daimler-Benz AG, Fed. Rep. of Germany

[21] Appl. No.: 525,679

[22] Filed: May 21, 1990

[30] Foreign Application Priority Data

May 19, 1989 [DE] Fed. Rep. of Germany ....... 3916354

[51] Int. Cl.$^5$ ........................... B62D 7/15; B62D 5/06
[52] U.S. Cl. .................................... 180/140; 180/142; 280/91; 364/424.05
[58] Field of Search .................. 280/91; 180/140, 142, 180/79.1; 364/424.1, 424.05

[56] References Cited

U.S. PATENT DOCUMENTS

| | | | |
|---|---|---|---|
| 3,888,328 | 6/1975 | Leiber | 180/160 |
| 4,840,243 | 6/1989 | Hirabayashi et al. | 180/140 |
| 4,926,955 | 5/1990 | Ohmura et al. | 180/142 |
| 4,941,095 | 6/1990 | Imaseki et al. | 180/140 X |

Primary Examiner—Richard A. Bertsch
Assistant Examiner—Kevin Hurley
Attorney, Agent, or Firm—Evenson, Wands, Edwards, Lenahan & McKeown

[57] ABSTRACT

A steering control system executes an automatic intervention in the steering of the rear axle when a $\mu$-split condition is detected, in order to stabilize the tracking of the vehicle. The steering always takes place in the direction of the vehicle side on which the higher braking torque is generated; this applies also to cornering, irrespective of whether the lower $\mu$-value is on the inside of the bend or on the outside of the bend and, furthermore, irrespective of whether the vehicle is being braked or accelerated.

14 Claims, 2 Drawing Sheets

STEERING CONTROL SYSTEM FOR A VEHICLE WITH A STEERED FRONT AXLE AND A STEERED REAR AXLE

BACKGROUND AND SUMMARY OF THE INVENTION

The present invention relates to a steering control system for a vehicle with a steered front axle and a steered rear axle, and more particularly, to a steering control system with an anti-lock system acting on all four wheels with a device for intervening in the steering of the rear axle.

A steering control system of the foregoing type is generally already known from Japanese Preliminary Publication 63-215466. A vehicle is equipped with two diagonally acting brake circuits and an anti-lock brake system (ABS) acts on the brake circuits as a reaction to a yawing moment which arises when, during a braking operation, the weight of the vehicle is shifted towards the front wheels. When different brake pressures are built up in the two brake circuits, an intervention in the steered rear axle takes place so that the steering lock counteracts the yawing moment. Thus, if a higher brake pressure is built up in the brake circuit containing the left front wheel than in the other brake circuit, a left-hand yawing moment of the vehicle about the vertical axis of the vehicle arises. In this case, a steering of the rear wheels of the vehicle takes place to the left as a function of the difference between the brake pressures in the two brake circuits, in order to compensate for the yawing moment which has arisen.

A disadvantage of a steering control system of the aforementioned known type is considered to be that stabilization of the driving behavior as a result of an intervention in the rear-axle steering is possible only in the special instance when a brake-pressure difference occurs in a vehicle equipped with diagonally acting brake circuits.

It is known from Japanese Preliminary Publication 62-255282 that the friction coefficient between the wheels of the vehicle and the road surface can be concluded from a comparison between the acceleration acting momentarily on the vehicle and a reference value of the acceleration under reference conditions. The existing relations of the coefficient of friction which are derived from this can be used for controlling a rear-axle steering.

A similar process is known from Japanese Preliminary Publication 62-238171, according to which the output signal of an ABS control unit serves for determining relations of the coefficient of friction between the wheels of the vehicle and the road surface. As a function of these relations of the coefficient of friction, in the case of low values of these relations the rear axle is deflected in-phase with the front wheels or not at all.

In the aforementioned known processes, it can be considered disadvantageous that only the general relations of the coefficient of friction of all the wheels are taken into account in the determination of a suitable steering angle of the rear axle, and that a compensation of a yawing moment arising as a result of $\mu$-split condition is not possible.

Furthermore, another steering control system is known from German Auslegeschrift 2,212,328, and in this system the different adhesion coefficients on the two sides of the vehicle are detected by measuring the brake-pressure difference occurring as a result of an anti-lock brake system (ABS). A vehicle yawing moment which has arisen is thus partially compensated for by an intervention in the steered front axle as a function of the brake-pressure difference. This intervention assists the driver's steering movement in order to generate a counter-moment.

A further known method of reducing the yawing moment during braking under $\mu$-split conditions is the time-delayed pressure build-up in the brake cylinder of the wheel having the higher adhesion coefficient as disclosed in German Patent Specification 2,518,196. The vehicle yawing moment caused as a result of the braking operating is thereby reduced, so that sufficient time remains for the vehicle driver to keep the vehicle in its track by appropriate counter-steering.

It is known from DE-3,124,821 A1 to design rear-axle steering in such a way that, as a function of the steering lock of the front wheels and of the vehicle speed, the rear wheels are deflected in the same direction as the front wheels, above a specific vehicle speed. Since, when a $\mu$-split condition occurs during braking, the vehicle driver steers in the direction of the lower coefficient of friction in order to compensate for the vehicle yawing moment which arises, the set rear-axle steering angle is no longer the best possible during braking under this $\mu$-split condition, this resulting in an intensification of the instability in the driving behavior of the vehicle.

An object of the present invention is to provide a steering control system so that the tracking of the vehicle is improved in such a way that the lateral guiding force is influenced and that, as a result, a stabilization of the braking and/or accelerating behavior is obtained. Another object of the present invention is to assure that the intervention of the steering control system takes place at a time when the vehicle has not yet assumed an unstable driving state.

In accordance with the present invention, a steering control system achieves the above objects by a detector for detecting different adhesion coefficients of at least two wheels of different sides of a vehicle, a device for intervening in the steering of the rear axle as a function of a difference between adhesion coefficients, and equipping the vehicle with a drive slip control (ASR) acting at least on the brakes of the driven wheels of the vehicle, regardless of whether there is an ABS signal or an ASR signal so that the intervening device causes a deflection of the rear wheels in the direction of the vehicle sides on which the higher brake torque is generated.

The provision of the steering intervention in the rear axle permits a simpler construction of the separation of the controlled steering intervention from the steering intervention of the vehicle driver in contrast to the known steering control system according to previously discussed German Auslegeschrift 2,212,328, in which the intervention of the vehicle driver and of the control take place at the same axle. Furthermore, the increase in the lateral guiding force of the rear wheels at the initial stage of the critical driving state ensures better stabilization of the tracking of the vehicle rear.

During the braking of a conventional vehicle without rear-axle steering under a $\mu$-split condition, a yawing moment arises in the direction of the higher adhesion coefficient and has to be compensated for by a correspondingly pronounced counter-steering. This counter-steering achieves the balance of forces and torques in such a way that the vehicle does not execute any rotational movement and moreover does not experience any lateral shift.

The steering of the rear wheels in the direction of the vehicle side on which the higher braking torque is generated assists the counter-moment generated as a result of the steering movement of the vehicle driver and thereby reduces the total necessary angle of lock of the steering wheel which is required for tracking of the vehicle.

The same result is also obtained in cornering, with the centrifugal force being taken into account in the force and torque balance equation. At the same time, the angle of lock of the rear wheels is to be proportional to the difference of the adhesion coefficients. The time taken for this angle to be obtained is not to exceed approximately 150 ms during rapid braking. In general, this time is not to exceed the duration of the pressure build-up in the main brake cylinder by any more than 150 ms.

The steering movement of the rear wheels leads to an increase in the lateral guiding force, so that the principle of the "select-low" control can be waived in the ABS. As a result, the brake pressure can be built up more quickly in comparison with non-steered rear wheels. The braking travel is thus shortened as a result of this intervention of the steering control system.

The same relationships are obtained when the vehicle is equipped with a drive-slip control (ASR). In the event of a $\mu$-split condition, a yawing moment arises during the acceleration of the vehicle. The steering movement of the vehicle driver in order to generate the counter-moment is assisted by a steering angle of the rear wheels in the direction of the vehicle side on which the higher braking torque is generated by the ASR. The size of the steering angle and the dynamics of the steering operation are similar to the relationships which are explained in the description of the braking operation. The steering movement of the rear wheels leads to an increase of the lateral guiding force without a rotation of the vehicle body, so that the tracking of the vehicle is stabilized.

The term "ABS/ASR system" signifies hereafter that an ABS system and/or an ASR system is installed in the vehicle. The different adhesion coefficients during the braking operation are detected by the ABS system, and the different adhesion coefficients during the acceleration operation are detected by the ASR system. If both ABS and ASR systems are installed, a stabilization of the braking and accelerating behavior is achieved, whereas if only one system (ABS or ASR) is installed a corresponding stabilization either of the braking or of the acceleration behavior is achieved.

The detection of the different adhesion coefficients on the two side of the vehicle is carried out by evaluating the control signals of the ABS/ASR system and/or their effects. The control signals of the ABS/ASR system are obtained from the evaluation of the speed sensors of the individual wheels (a cornering of the vehicle has to be taken into account, where appropriate, here). The control signals of the ABS/ASR system lead to different brake pressures in the wheel-brake cylinders, and where the two systems are concerned the following must be remembered:

ABS: Higher brake pressure on the side of the higher adhesion coefficient.

ASR: Higher brake pressure on the side of the lower adhesion coefficient.

During both braking and acceleration, the steering lock of the rear wheels takes place in the direction of the vehicle side on which the higher braking torque is generated. The effects of the control signals from the ABS/ASR system can be:

1. Pressure differences in the wheel-brake cylinders of different sides of the vehicle; these pressure differences can be measures by known differential-pressure sensors or by absolute pressure measurements with subsequent differentiation.

2. Difference between the moments on the wheels; these moments can be determined by torque-measuring hubs or by contactless torque measurements.

3. Difference between the forces on the brake callipers; the braking operating leads to a shift of the brake callipers out of the position of rest and to a deformation relative to the position of rest. The shift or deformation can be detected by known methods of length measurement.

BRIEF DESCRIPTION OF THE DRAWINGS

These and further features, objects and advantages of the present invention will become more apparent from the following detailed description of a preferred embodiment of the present invention when taken in conjunction with the accompanying drawings wherein.

DETAILED DESCRIPTION OF THE DRAWINGS

Figure 1:
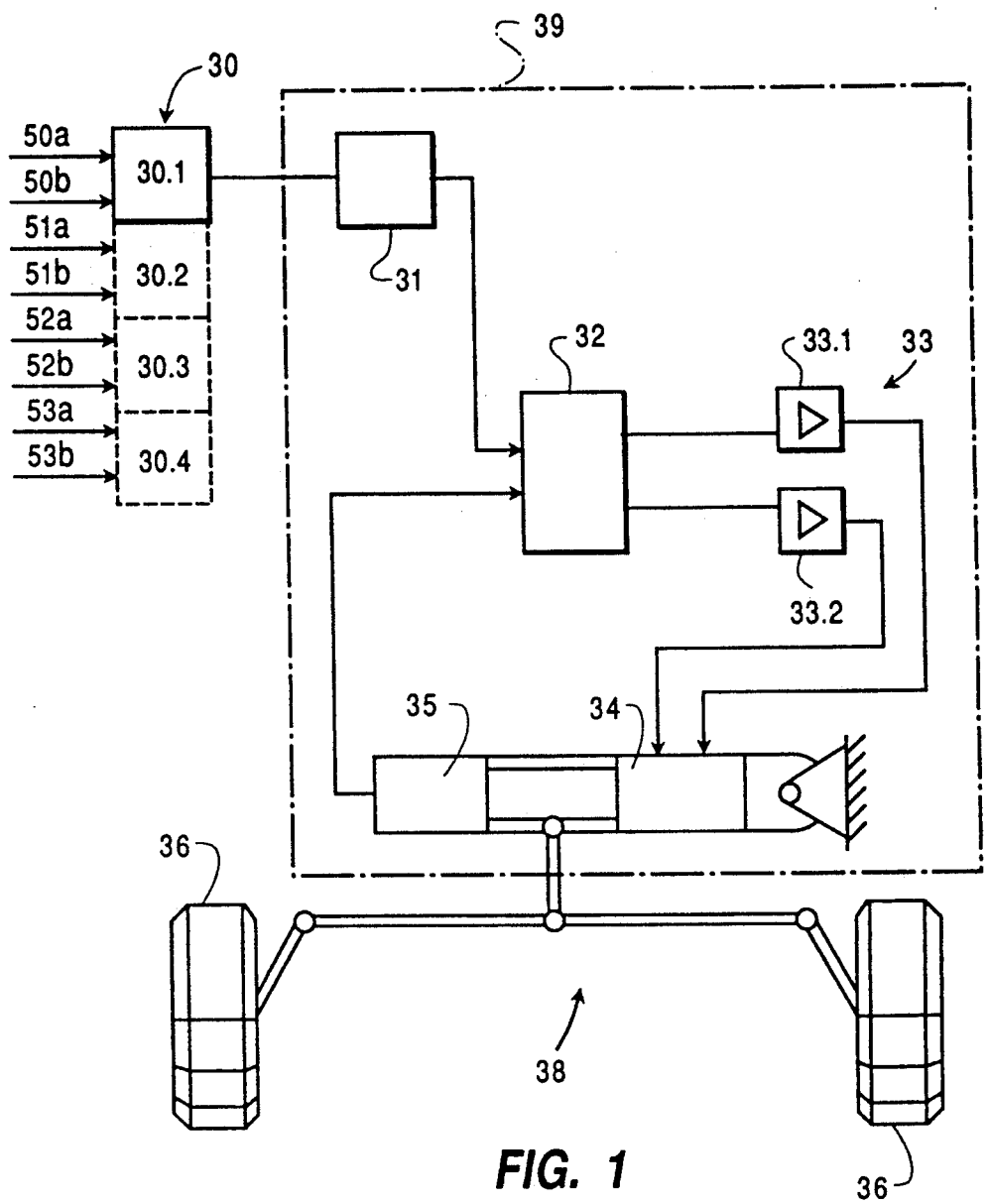
FIG. 1 is a functional block diagram of the steering control system in accordance with the present invention.
Figure 1A:
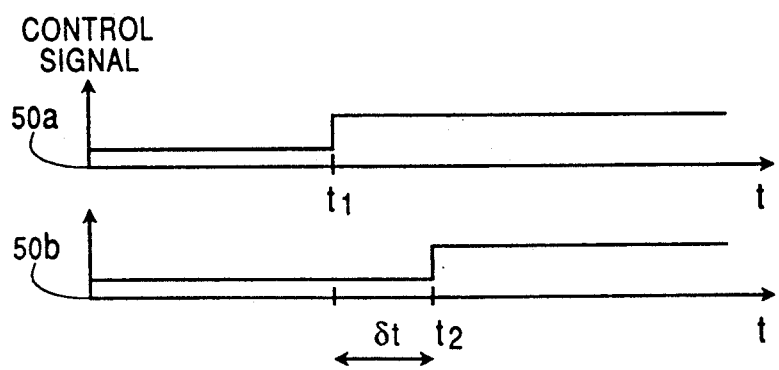
FIG. 1a is a graph showing the time trend of the control signals of an ABS system during a braking operation.

As shown in FIG. 1, a transformer 30.1 of the detecting system 30 determines the difference between adhesion coefficients from the difference between control signals 50a, 50b of an ABS/ASR system for at least two wheels of different sides of the vehicle. This can be carried out, for example according to FIG. 1a, by measuring the control signals 50a, 50b issued by the ABS system during a braking operation. The control signal 50a is the control signal for a wheel on the vehicle side with the lower $\mu$-value; the control signal 50b is the control signal for a wheel on the vehicle side with the higher $\mu$-value. As a function of the point in time $t_1$ at which the control signal 50a has changed to "reduce pressure", the control signal 50b likewise changes to "reduce pressure" at a time interval $\delta t$. This time interval $\delta t$ is a measure of the $\mu$-split condition and is thus used for determining the angle of lock of the rear wheels. Alternatively, instead of the transformer 30.1, transformers 30.2, 30.3 or 30.4 with associated measurement quantities can also be used as described below.

After the computation of the difference between the adhesion coefficients in the transformer 30.1, a desired value for the angle of lock of the rear wheels is determined from a difference in the characteristics store 31. This desired value is output to the comparator 32 which, from the difference between the desired value of the angle of lock of the rear wheels and the actual value supplied, determines a setting signal and outputs this to the amplifiers designated by the numeral 33, and doubled for the two lock directions, namely the amplifier 33.1 to the right and the amplifier 33.2 to the left. The output signal of one of the amplifiers 33.1, 33.2 is transmitted to the setting device 34 which causes a steering lock of the rear axle 38. As a result of this steering lock of the axle, the steering angle of the rear wheels 36 is obtained. By virtue of the measuring transformer 35, an actual value of the angle of lock of the rear wheels is determined from the set quantity and is fed back to the comparator 32.

The transformer system 30 can, as briefly mentioned above, be produced in different ways as a function of the particular measurement quantity used. As an alternative to the transformer 30.1, for example, the transformer 30.2 can determine the difference between adhesion coefficients from the difference between torque signals 51a, 51b of at least two wheels of different sides of the vehicle, their detection also being explained in conjunction with the description of FIG. 2. The transformer 30.3 can determine the difference between the adhesion coefficients from the difference between the pressures in the wheel-brake cylinders of at least two wheels of different sides of the vehicle. This can be carried out by a differential-pressure sensor or by an absolute measurement of the pressures in the wheel-brake cylinders and subsequent appropriate subtraction. The difference between the adhesion coefficients is then determined from this difference between the pressures. A measuring arrangement is shown diagrammatically in FIG. 3. The leads to the transformer 30.3 are designated by numerals 52a, 52b. The transformer 30.4 can determine the difference between the adhesion coefficients from the difference between the forces on the brake callipers of at least two wheels of different sides of the vehicle. One contemplated measuring arrangement for determining the force on an individual brake calliper is shown in FIG. 4.

Figure 2:
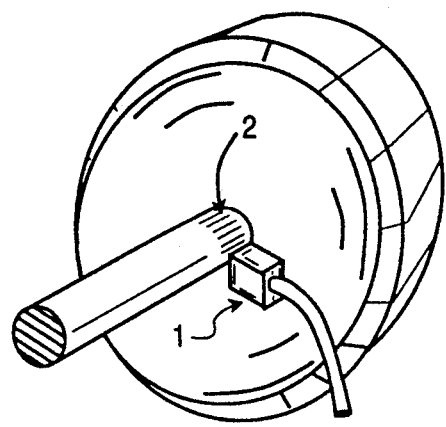
FIG. 2 is a perspective view of a wheel with an associated axle to illustrate the position of the torque-measuring sensor.

As is evident from FIG. 2, the torque occurring on a wheel can be measured by a sensor 1 through a contactless inductive detection of the magnetostriction of a layer 2 applied to the axle. The signal lines of the sensors of at least two wheels of different sides of the vehicle correspond to the leads 51a, 51b to the transformer 30.2.

Figure 3:
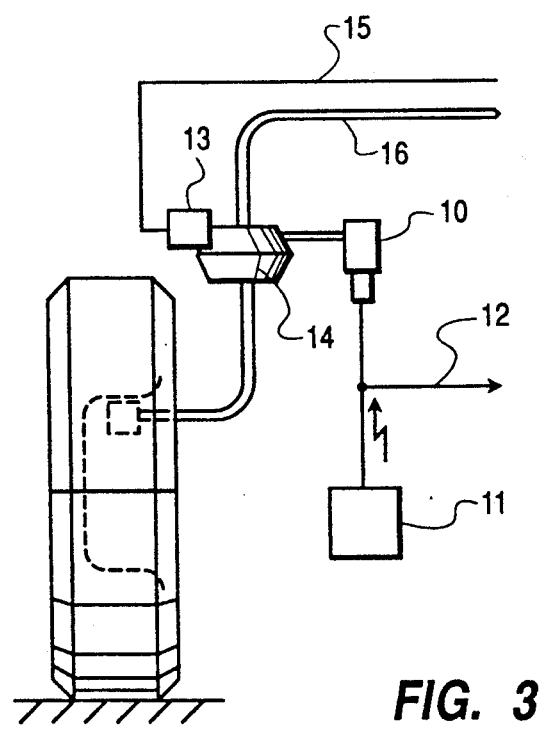
FIG. 3 is a front elevational schematic view of a wheel with an associated ABS/ASR system.

FIG. 3 illustrates a wheel with an associated ABS/ASR system. In response to the speed signals from the speed sensors (not shown), a control signal 12 is transmitted where appropriate to a solenoid valve 10 by control electronics 11 of the ABS/ASR system. This control signal 12 can be used as a measurement quantity for the transformer 30.1. The solenoid valve 10 controls the pressure in the wheel-brake cylinders 14. The pressure in these wheel-brake cylinders can be used as a measurement quantity for the transformer 30.3. At the same time, the line 16 constitutes a hydraulic line, so that the direct use of a differential-pressure sensor for the lines of at least two wheels of different sides of the vehicle is possible in the transformer 30.3. Alternatively to this, a pressure signal for each wheel-brake cylinder can be determined by the pressure sensor 13 and transmitted via the signal line 15. The corresponding lines for the pressure measurement are designated 15 as leads to the transformer 30.3, by the numerals 52a and 52b.

Figure 4:
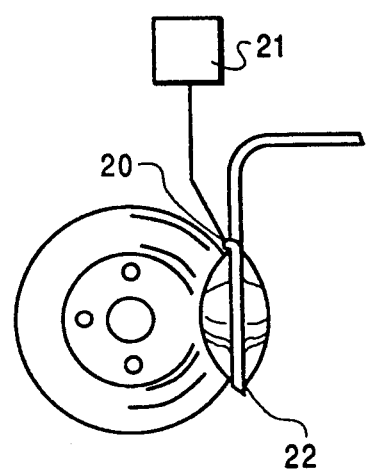
FIG. 4 is a side elevational schematic view of a brake disc with an associated brake calliper.

In FIG. 4, a deformation and/or shift of the brake calliper 22 is detected by a strain gauge 20. By virtue of the measuring transformer 21, the force acting on the brake calliper 22 is determined from the signal of the strain gauge and is fed to the transformer 30.4 via the signal lines 53a, 53b.

A functional description of the steering control device is now given, the driving conditions being that the vehicle is negotiating a bend, the grip of the wheels is subjected to a $\mu$-split condition and the vehicle drive is braking the vehicle. Without any intention to restricting general features, it will be assumed, in the following example, that the lower $\mu$-value is on the inside of the bend and that the bend is a left-hand bend. Thus, under the conditions just mentioned, a difference between the adhesion coefficients on the left side and right side of the vehicle is detected by the system 30 with the aid of a suitable, previously described measuring arrangement. The characteristics store 31 makes a desired-value setting on the steering of the rear wheels in the direction of the vehicle side on which the higher braking torque is generated, i.e. where the braking in the present situation is concerned, towards the outside of the bend. As a result of the already mentioned time lapse, the actual value of the rear-wheel steering is locked onto the desired value. The angle of this rear-wheel steering as a result of the intervention of the control is superposed on a possibly already existing rear-wheel steering angle. In the event of acceleration in the left-hand bend, the steering lock of the rear wheels likewise takes place in the direction of the higher braking torque, i.e. the steering lock then goes toward the inside of the bend.

The steering therefore always takes place in the direction of the vehicle side on which the higher braking torque is generated; this also applies to cornering, irrespective of whether the lower $\mu$-value is on the inside of the bend or on the outside of the bend, and furthermore irrespective of whether the vehicle is being braked or accelerated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Steering control system for a four-wheel vehicle with a steered front axle and a steered rear axle, comprising
    an anti-lock system operatively arranged to act on all four wheels;
    a device for intervening in steering of the rear axle such that, during a braking operation in which a different braking effect occurs on the left and on the right side of the vehicle, steering lock of the rear axle counteracts a yawing moment which arises, and the rear wheels are deflected in the direction of the vehicle side on which a higher braking effect occurs;
    means for detecting different adhesion coefficients of at least two wheels of different sides of the vehicle, the difference between the adhesion coefficients being detected from a difference between different occurring brake pressures of at least two wheels of different sides of the vehicle in response to the control signals of one of an anti-lock system and a drive-slip control, wherein the device for intervening in the steering of the rear axle of the vehicle intervenes as a function of the difference between the adhesion coefficients; and a drive-slip control acting at least on brakes of the driven wheels of the vehicle, independently of whether there is an anti-lock system signal or a drive-slip control signal, wherein the device causes a deflection of the rear wheels in the direction of the vehicle side on which the higher braking torque is generated.

2. The steering control system according to claim 1, wherein the rear wheels are operatively arranged to be deflected in the direction of the vehicle side on which the higher braking torque is generated, at an angle which is proportional to the difference between the detected adhesion coefficients.

3. The steering control system according to claim 1, wherein the rear wheels are operatively arranged to be deflected in the direction of the vehicle side on which the higher braking torque is generated, at an angle which is proportional to the detected braking-torque difference between at least two wheels of different sides of the vehicle.

4. The steering control system according to claim 1, wherein an angle of lock of the rear wheels is superposed on any already existing rear-axle steering angle as a result of the detected difference.

5. The steering control system according to claim 4, wherein the rear wheels are operatively arranged to be deflected in the direction of the vehicle side on which the higher braking torque is generated, at an angle which is proportional to the difference between the detected adhesion coefficients.

6. The steering control system according to claim 4, wherein the rear wheels are operatively arranged to be deflected in the direction of the vehicle side on which the higher braking torque is generated, at an angle which is proportional to the detected braking-torque difference between at least two wheels of different sides of the vehicle.

7. The steering control system according to claim 1, wherein means are provided for measuring the pressure difference of the brake cylinders of at least two wheels of different sides of the vehicle to carry out the detection of the different adhesion coefficients.

8. The steering control system according to claim 1, wherein means are provided for direct measurement of the torques acting on at least two wheels of different sides of the vehicle to carry out the detection of the different adhesion coefficients.

9. The steering control system according to claim 1, wherein means are provided for measuring the forces which act on the brake callipers of at least two wheels of different sides of the vehicle to carry out the detection of the different adhesion coefficients.

10. The steering control system according to claim 1, wherein means are provided for measuring and evaluating control signals of the anti-lock system for at least two wheels of different sides of the vehicle to carry out the detection of the different adhesion coefficients.

11. The steering control system according to claim 10, wherein solenoid valves of the brakes of at least two wheels of different sides of the vehicle are controlled by the control signals of the anti-lock system.

12. The steering control system according to claim 1, wherein means are provided for measuring and evaluating the control signals of the drive-slip control for at least two wheels of different sides of the vehicle to carry out the detection of the different adhesion coefficients.

13. The steering control system according to claim 10, wherein solenoid valves of the brakes of at least two wheels of different sides of the vehicle are controlled by the control signals of the drive-slip control.

14. The steering control system according to claim 1, wherein the device for intervention is operatively arranged so that an intervention in the steering of the rear wheels takes place only above a threshold value of the difference between the adhesion coefficients on the left and right sides of the vehicle.

* * * * *